United States Patent [19]

Chen

[11] Patent Number: 5,598,746
[45] Date of Patent: Feb. 4, 1997

[54] TRANSMISSION ASSEMBLY

[76] Inventor: Ching-Ti Chen, Suite 1, 11F, 95-8 Chang Ping Road, Sec. 1, Taichung, Taiwan

[21] Appl. No.: 334,448

[22] Filed: Nov. 4, 1994

Related U.S. Application Data

[63] Continuation of Ser. No. 30,651, Mar. 12, 1993, abandoned.

[51] Int. Cl.⁶ ............................. F16H 57/02; G09F 19/08
[52] U.S. Cl. ................ 74/606 R; 74/89.16; 74/421 R; 74/526; 74/DIG. 10; 40/414; 40/430; 384/246; 384/901; 403/361
[58] Field of Search .............. 74/89, 89.16, 96, 74/98, 421 R, DIG. 10, 606 R, 526; 40/411, 414, 426, 430; 403/263, 354, 361, 364; 446/130, 175, 298; 384/246, 901

[56] References Cited

U.S. PATENT DOCUMENTS

| | | | |
|---|---|---|---|
| 2,282,430 | 5/1942 | Smith | 40/426 |
| 3,991,535 | 11/1976 | Keller et al. | 403/364 X |
| 4,616,164 | 10/1986 | Kenny et al. | 74/DIG. 10 X |
| 4,802,372 | 2/1989 | Harrod et al. | 74/DIG. 10 X |
| 4,824,416 | 4/1989 | Chun-Hoi et al. | 446/298 |
| 4,973,891 | 11/1990 | Tzeng | 40/414 X |
| 4,983,890 | 1/1991 | Satoh et al. | 446/175 X |

*Primary Examiner*—Allan D. Herrmann

[57] ABSTRACT

A transmission assembly used to connect with a rotatable ornament or a toy to provide bilateral rotations for achieving their cosmetic effect comprises a casing enclosing a set of three pinions which are driven by a battery-operated electrical circuit therein. An elastic rectangular bar used to restrict the rotary extent of a first pinion will elastically obstruct the rotary movement of the pinion in order to provide continuous bilateral rotation and each turn of the bilateral rotation will exceed 360° without making any noise. The noses of the spindles of the pinions are formed as tapering sockets or as tapering pointed plugs to enhance the intensity of the assembly. Most of the components in this assembly are made integrally of plastic material so as to reduce the time and cost to manufacture.

1 Claim, 6 Drawing Sheets

TRANSMISSION ASSEMBLY

This is a continuation of U.S. patent application Ser. No. 08/030,651, filed on Mar. 12, 1993, now is abandoned.

BACKGROUND OF THE INVENTION

The present invention relates to transmission assemblies, particularly to a structurally improved transmission assembly which is applicable to be connected with an ornamentation or a doll for performing bilateral rotation to achieve their cosmetic effect, and the parts such as those precise yet breakable spindles used in the assembly will be prevented from damages during their manufacturing, packing or transportation.

Current transmission assemblies for rotatable toys are composed of a plurality of pinions and electro-magnetically actuated by a set of battery and circuit. Upon the engagement of the pinions in different gear ratio, the transmission assembly can provide reversible spins to an ornament as they are connected together. However, it presents at least the following disadvantages outlined as follows:

1. Most spindles of the pinions have their tapering pointed noses diametrically lesser than their bodies that are breakable in manufacturing or in packing, 2. Some of those pinions are composed of several parts in different material, such as a pinion is comprised of a metallic spindle, a plastic gear and a flat magnetic ring which causes a complicated manufacturing process and a difficult quality control for a producer, 3. Those sockets used to bear up the noses of those spindles in their casings are mostly inlaid with rubies in order to be durable and free from friction drag. But the rubies are found cracked under heavy pressure of the rotatable magnetic ring. Although some of the producers adapting frictionless metallic material instead of the rubies, they are failed because the metal is rusty and easily causes directional deviation during their assembling.

4. A brake block on the inner periphery of the casing which is made incorporated with a stopping rod on a main pinion to have that pinion to be reversibly rotated is made of hard material that unavoidably causes continuous tapping noise. Since the brake block is stably disposed on the inner periphery of the casing, once the stopping rod touches on, the on rotating pinion will return back immediately for another turn of bilateral rotation. Thus, each turn of such bilateral rotation can never exceed 360°. The producer also adapts an elastic metallic plate instead of the stable brake block in order to provide adequate elasticity to eliminate the tapping noise and to have that each turn of the bilateral rotation of the main pinion can exceed 360°. But all in vain because the metallic material is rusty and it brings up complications in manufacturing process. Another example is a plastic sleeve wrapped on the stable brake block which can eliminate the tapping noise, but it makes the extent of each turn of the reverse rotation more less. Besides, it consumes more manpower.

SUMMARY OF THE PRESENT INVENTION

The main object of the present invention is to provide a transmission assembly of which nearly all the components are made integrally in plastic material in order to simplify the manufacturing process to reduce the cost of production.

Another object of this invention is to provide a transmission assembly which reforms the tapering pointed noses of its spindles into the tapering sockets and its sockets on the inner wall of the casing into tapering pointed plugs, so as to prevent those spindles from breaking up during manufacturing, packing or transportation. Optionally, a tapering pointed plug may be formed inside a tubular cavity to provide adequate protection.

Another object of this invention is to provide a transmission assembly, in which plastic steel is adapted instead of the ruby or the frictionless metal used to inlay those sockets therein to solve the problems of cracking or rusting.

Still another object of this invention is to provide a transmission assembly, in which a piece of flat elastic rectangular bar, instead of the stable brake block, is integrally formed with the plastic casing which can provide adequate resilient force to resile the stopping rod to return back at each turn of bilateral rotation and each turn will exceed 360°. The tapping noise is therefore eliminated.

Accordingly, the present invention of a transmission assembly comprises a plastic casing, a set of three pinions driven by a conventional battery-operated electrical circuit thereof. The casing which has a generally tray shaped square lower portion and a rectangular cover being bent on four sides downwardly to form a flange and a pair of lugs. On the inner wall of the bottom of the lower portion, there are a tubular sleeve at the center of a circular depression, a pair of tubed tapering pointed plugs in the proximity of the depression, a flat rectangular bar integrally formed at one end extending parallel from the center bottom of a side wall and terminated at a position in the proximity of the circular depression, and a compartment to form a battery chamber on the rear portion of the casing. A first pinion comprises a plastic gear wheel having integrally formed a journal at center, a concentric annular ring for reinforcing a stopping rod on under side, and a metallic spindle vertically secured in the journal of the gear wheel with a tapering pointed nose formed on the upper end of the spindle. A second pinion is centrally formed with a first tapering socket on the top of a tube member slightly projecting upwardly from the top center thereof, a cylindrical step-gear projected downwardly from the bottom center thereof with a less diameter cylindrical spindle extending from it's lower end, including a second tapering socket formed on the lower end thereof. A third pinion is integrally formed in plastic of a multi-diametric spindle being perpendicular to the top of a small gear centrally projected from a larger diameter circular plate, on which four spaced sectorial members are radially extended in cooperation with a plurality of spacedly out-curved flange members downwardly extending from the circumference thereof to form an annular grasping space for securing a large diameter flat magnetic ring therein and a pair of tapering sockets are respectively formed on the upper and lower ends of the spindle. On the rectangular cover, there are a pair of tapering pointed plugs and a tapering socket integrally formed on the inner wall thereof at their positions in registry with those tubed tapering pointed plugs and tubular sleeve of the tray shaped square lower portion for axially securing the three pinions therebetween. The tray shaped square lower portion is firmly closed by the rectangular cover as the three pinions are all fixed in place in their tapering sockets or tapering pointed plugs. The pair of lugs on the rectangular cover are retained by a pair of catches at the center of a pair of rectangular grooves on the lateral sides of the tray shaped square lower portion. The pinions are actuated to perform their bilateral rotation continuously by the battery-operated electrical circuit which secures in place of the casing.

The objects and advantages of this invention will become apparent in a consideration of enusing the description with drawings.

DETAILED DESCRIPTION OF THE PREFERRED EMBODIMENT OF THE PRESENT INVENTION

Figure 1:
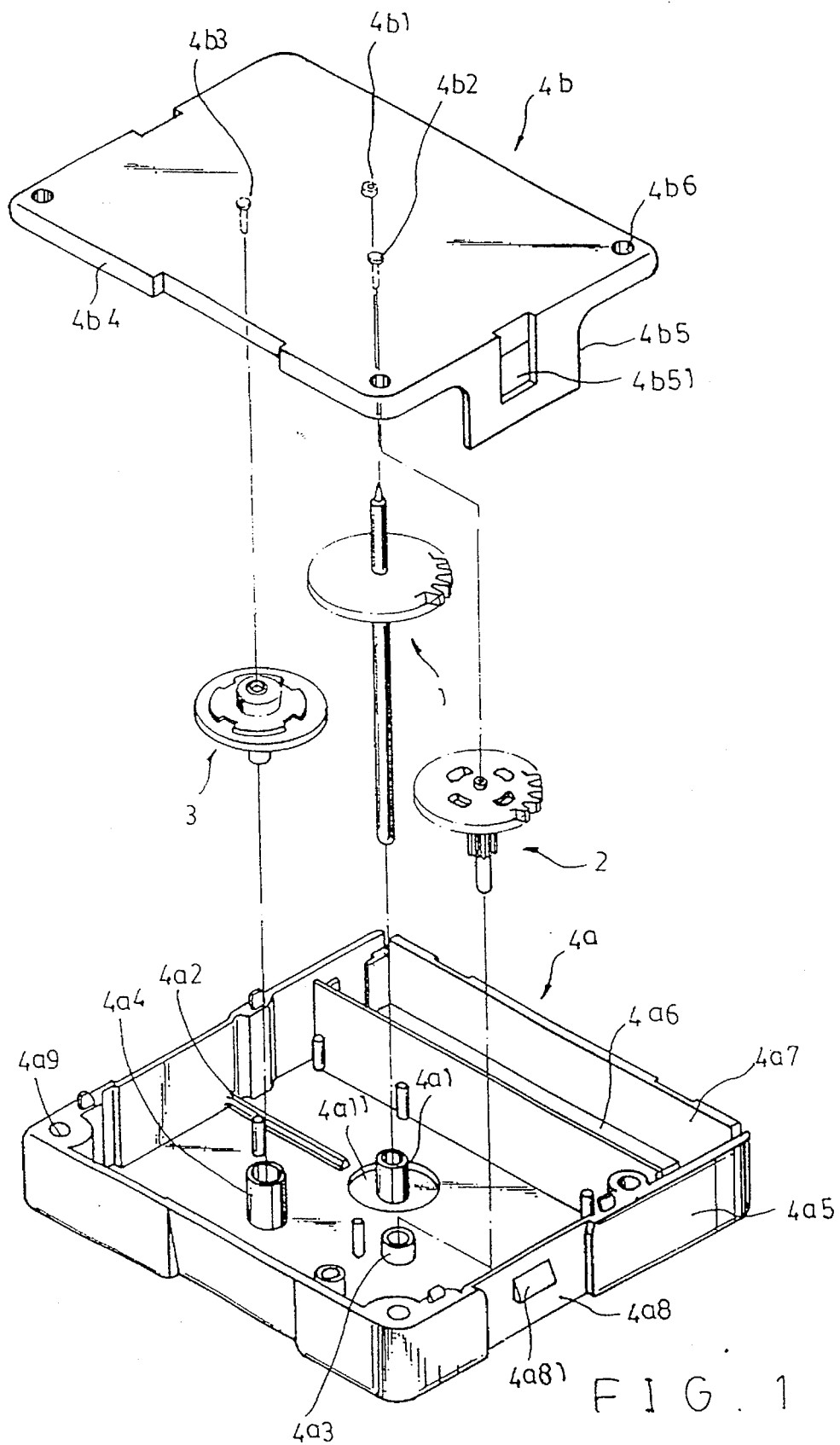
FIG. 1 is a schematic perspective view showing the components of a preferred embodiment according to the present invention.
Figure 4A:
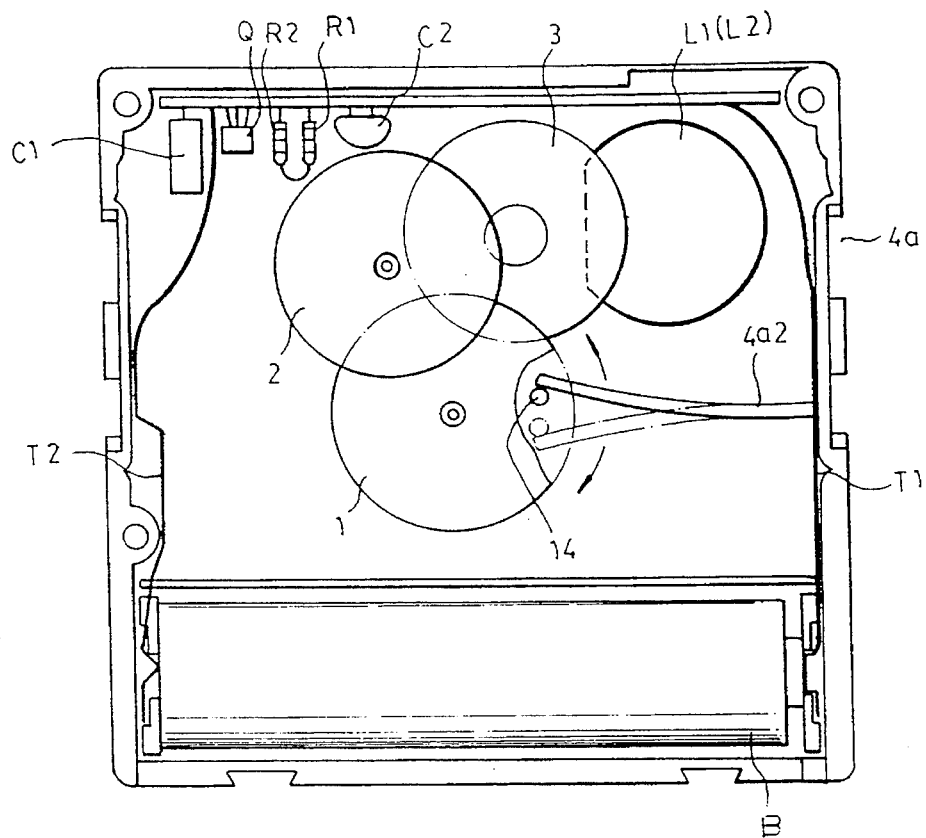
FIGS. 4A and 4B are the top plane view and the elevational front view to show the operational status of the aforesaid preferred embodiment in cooperated in with an electrical circuit according to the present invention.

Referring to FIG. 1, the present invention of a transmission assembly comprises generally a casing enclosed three pinions 1, 2 and 3 therein which is driven by a battery-operated electrical circuit (as shown in FIG. 4A). The casing comprises a tray shaped square lower portion 4a and a rectangular cover 4b. The lower portion 4a includes four side walls 4a5, a compartment 4a6 in the proximity of a rear side wall to define a rectangular battery chamber 4a7, a tubular sleeve 4a1 projected upwardly at the center of a circular depression 4a11 which locats at the center of the inner surface of the bottom, a pair of tubed tapering pointed plugs 4a3 and 4a4 projected upwardly from the inner surface adjacent the depression 4a11, an elastic rectangular bar 4a2 extruded from the bottom of the side wall 4a5 extending inwardly and terminated at a position adjacent to the circular depression 4a11, a pair of rectangular grooves 4a8 respectively formed on the outer surface of the lateral walls 4a5', each has a rectangular catch 4a81 centrally formed therein and a plurality of screw apertures 4a9 vertically formed on the respective corners between the corresponding side walls for connecting with the base of an ornament.

The rectangular cover 4b has been bent on four sides to form downward flanges 4b4 and a lug 4b5 at each lateral side adjoining the flange 4b4. A rectangular recess 4b51 on the upper center of each lug 4b5 is formed in registry with the catch 4a81 on the lower portion 4a of the casing. A pair of tapering pointed plugs 4b2 and 4b3 and a tapering socket 4b1 are formed on the inner surface of the rectangular cover 4b and positioned in registry with the tubed tapering pointed plugs 4a3 and 4a4 and the tubular sleeve 4a1 on the inner surface of the lower portion 4a. A plurality of screw apertures 4b6 are formed in registry with their corresponding screw apertures 4a9 at respective position of the lower portion 4a.

Figure 2A:
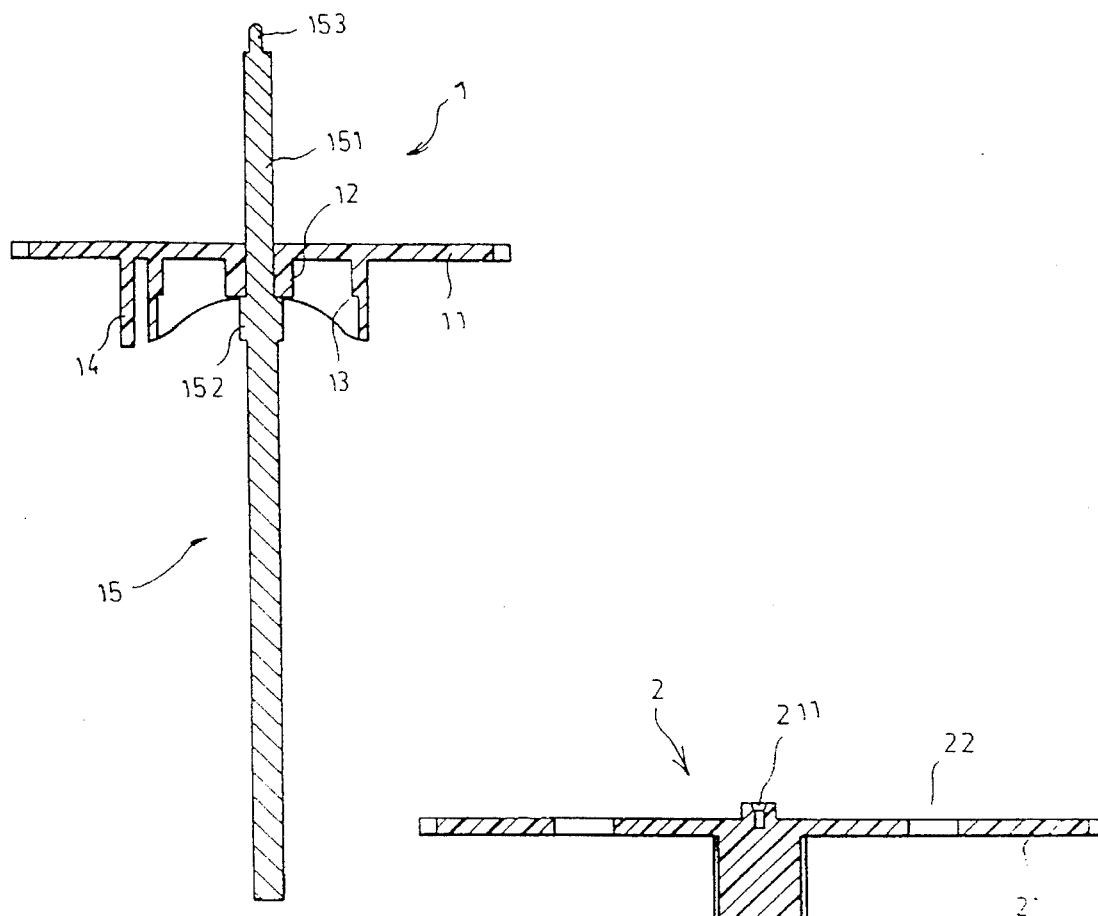
FIGS. 2A to 2C are the sectional views showing the three pinions of the aforesaid preferred embodiment according to the present invention.

Referring to FIGS. 1 and 2A, a first pinion 1 comprises a plastic gear 11 which has a journal 12 integrally formed at center, a concentric annular ring 13 with a curved edge and varied height protruded downwardly encircling the journal 12 for reinforcing the pinion 1 and a stopping rod 14 extended downwardly from an under side adjacent the outer periphery of the annular ring 13. A metallic spindle 15, having a shoulder 152 at a position in the proximity of upper portion, diametrically larger than the cylindrical body 151 of the spindle 15 and a tapering pointed plug 153 on top end.

The spindle 15 is perpendicularly secured into the journal 12 of the gear 11 with the upper surface of the shoulder 152 closely stopped against the lower surface of the journal 12.

Figure 2B:
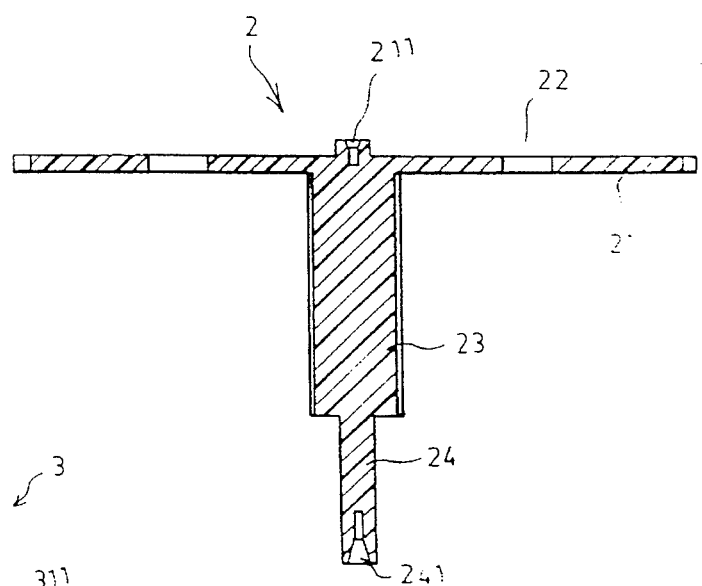

Referring to FIGS. 1 and 2B, a second pinion 2, which is completely made of plastic material, comprises a gear 21 having four roughly rectangular recesses 22 and concentrically formed spacedly on the planar portion, a tapering socket 211 at top center which is slightly extruded upwardly from the upper surface of the gear 21, a less diameter step gear 23 downwardly extended from the center of the under side of the gear 21, and a spindle 24 sequentially extended downward from the lower end of the step gear 23 having a smallest diameter with a concentric tapering socket 241 at the lower end thereof.

Figure 2C:
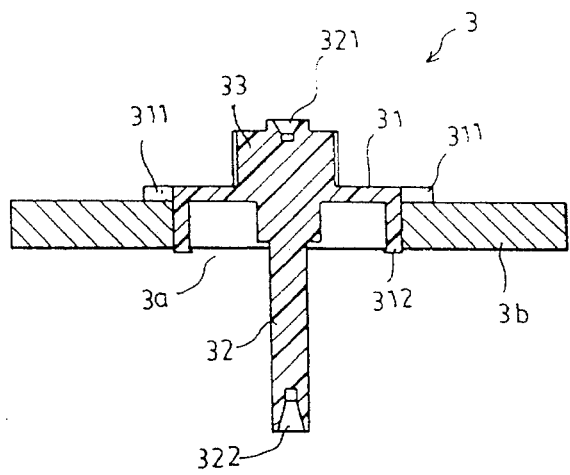

Referring to FIGS. 1 and 2C, a third pinion 3 comprises a plastic base 3a and a flat magnetic annular ring 3b. The plastic base 3a has a circular plate 31, a multi-diameter spindle 32 perpendicularly connected at the bottom center thereof, a smaller diameter gear 33 slightly extruded upwardly from the top center thereof, a pair of tapering sockets 321 and 322 respectively disposed on the two ends of the spindle 32, four sectorial members 311 spacedly extended outward incorporating with a plurality of spacedly outcurved flange members 312 extended downwardly from the circumference of the circular plate 31 to form an annular grasping space for securing the flat magnetic annular ring 3b therein which has a inner diameter equal to the outer diameter of the circular plate 31.

Figure 3A:
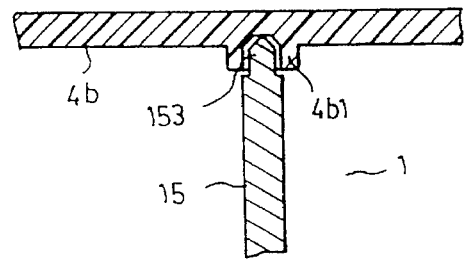
FIGS. 3A to 3C are the sectional views showing the spindles of pinions being positioned in place of the respective tapering pointed plugs according to the present invention.
Figure 3B:
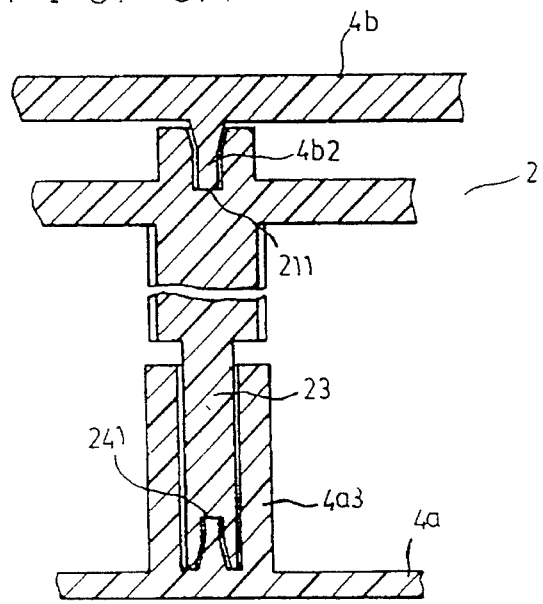
Figure 3C:
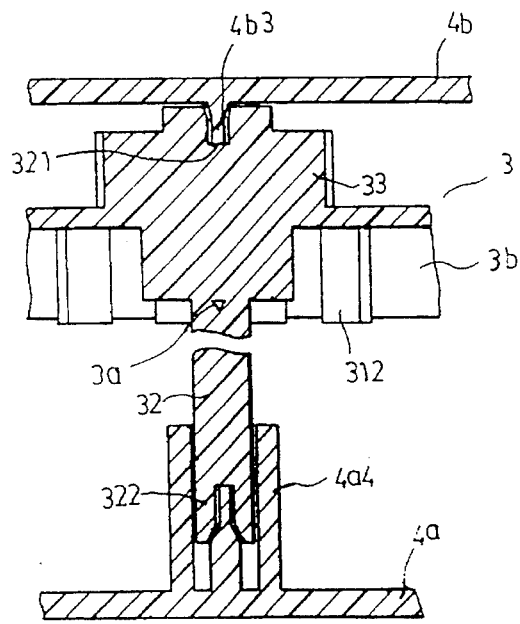

Referring to FIGS. 3A to 3C, illustrate the interrelationship between those tapering sockets at the ends of spindles and those tapering pointed plugs or tubed tapering pointed plugs on the inner surface of the casing. FIG. 3A shows a tapering pointed plug 153, on top of the spindle 15 of the first pinion 1 inserted into a tapering socket 4b1 on the inner surface of the rectangular cover 4b and the other end of the spindle 15 passed through a tubular sleeve 4a1 and extended outward from the casing. FIG. 3B shows a pair of tapering sockets 211 and 241 at the top center and the lower end of the spindle 24 of the second pinion 2 respectively coupled with a tapering pointed plug 4b2 on the inner surface of the rectangular cover 4b and a tubed tapering pointed plug 4a3 on the inner surface of the tray shaped lower portion 4a of the casing. FIG. 3C shows a pair of tapering sockets 321 and 322 at two ends of the spindle 32 of the third pinion 3 respectively coupled with a tapering pointed plug 4b3 on the inner surface of the rectangular cover 4b and a tubed tapering pointed plug 4a4 protruded from the inner surface of the tray shaped lower portion 4a of the casing.

The inner diameter of those tubed tapering pointed plugs 4a3 and 4a4 on the inner surface of the tray shaped lower portion 4a are limited never less than 0.7 mm when compare with a 0.68 mm outer diameter of the spindles 24 and 32 so as to permit the spindles to be smoothly swung therein. The length of those tapering pointed plugs 4b2 and 4b3 are also limited not to exceed the height of the downward flange 4b4 of the rectangular cover 4b in order to be protected from external impact.

Figure 5:
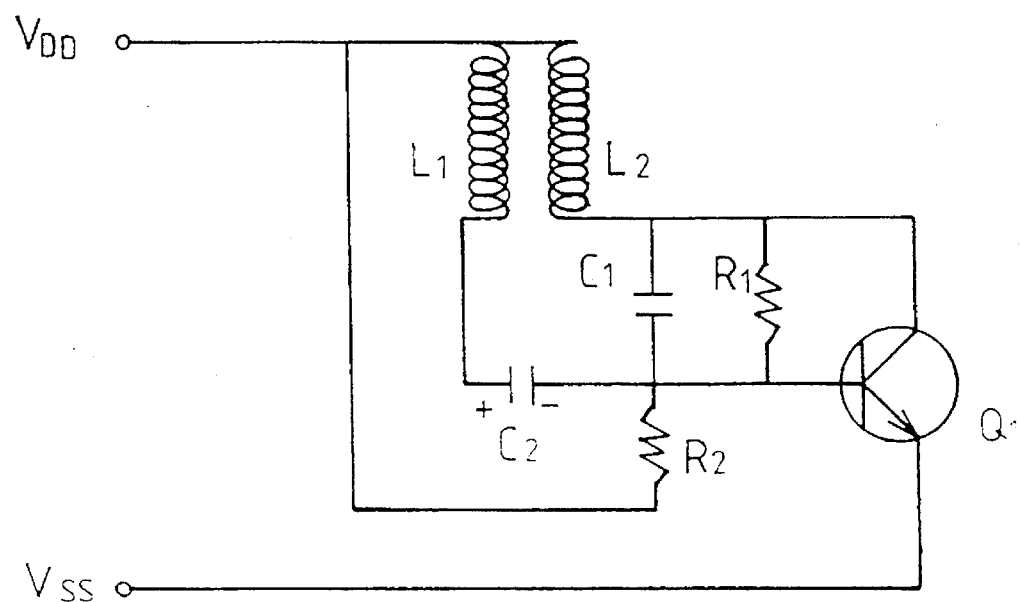
FIG. 5 is a block diagram of the present invention.

Referring to FIG. 4A, the electrical circuit comprises a pair of contact means T1 and T2, a pair of coils L1 and L2 which are jaxtaposed, a pair of capacitors C1 and C2, a pair of resistors R1 and R2, and a transistor Q. The contact means T1 and T2 are connected on one end to the anode and cathode of a battery B. FIG. 5 is a block diagram which shows the function of the electrical circuit.

When the three pinions 1, 2 and 3 are settled on their lower portions in the respective sleeve or tapering pointed plugs 4a1, 4a3 and 4a4 subsequently after the securement of the conventional battery-operated electrical circuit, the tray shaped lower portion 4a is closed by the rectangular cover 4b in the manner such that the pair of rectangular catches 4a81 at the center of the rectangular grooves 4a8 on the lateral sides of the lower portion 4a, will stop in place inside the pair of rectangular recesses 4b51 at the center of rectangular lugs 4b5 on the corresponding lateral sides of the rectangular cover 4b in a snap fitting, so as the upper portions of the three pinions 1, 2 and 3 are automatically settled in place in their respective tapering socket 4b1 or tapering pointed plugs 4b2 and 4b3. The screw apertures 4a9 and 4b6 are reserved for connecting to a planar surface of an article.

Figure 4B:
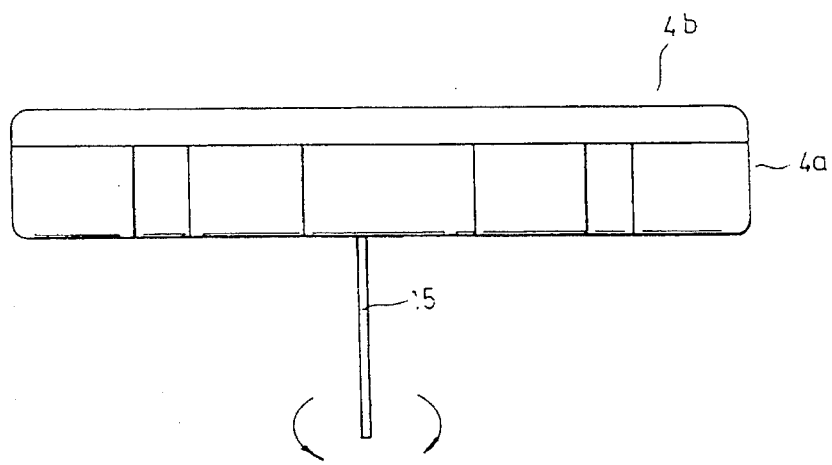
Figure 6:
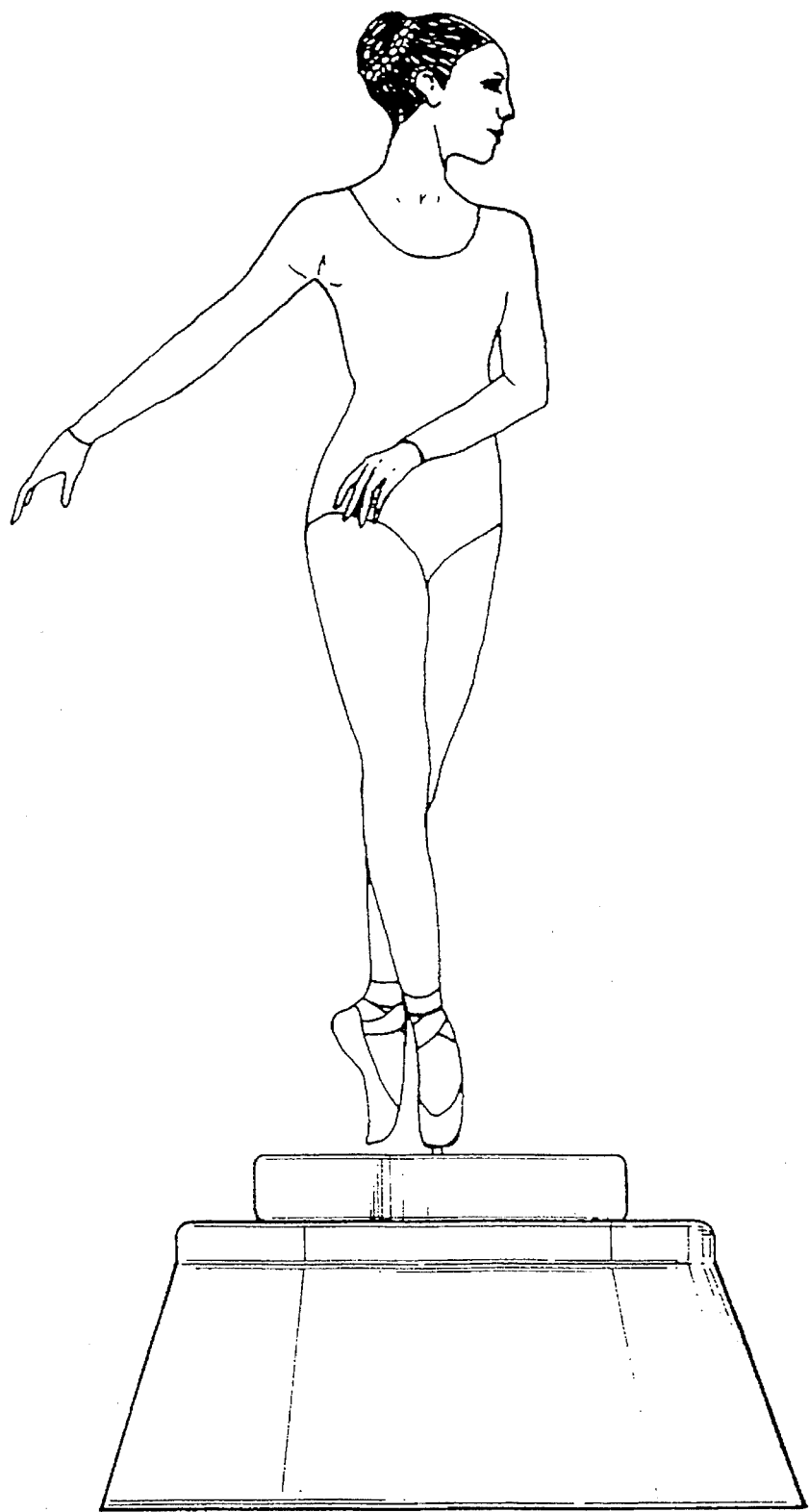
FIG. 6 shows an ornament attached to the elongate spindle of the present invention.

Referring to FIGS. 4A and 4B, shows an operational status of a transmission assembly according to the present invention. FIG. 4A indicates the first pinion 1 on which the stopping rod 14 is stopped by the elastic rectangular bar 4a2 while on rotating. Each turn of the rotation, clockwise or anticlockwise, will be obstructed and set back by the bar 4a2 on either side, so that the first pinion 1 is enforced to make continuous bilateral rotation in cooperation by the other two pinions 2 and 3 and the pinion 1 is actuated by the battery-operated electrical circuit inside the casing. Because of the elasticity of the rectangular bar 4a2, the extent of each turn of bilateral rotation of the first pinion 1 can exceed 360°. FIG. 4B is a elevational front view of the transmission assembly indicating the lower portion of the elongated spindle 15 of the first pinion 1, which is the only one of the spindles extruded out of the casing for the connection with a selected ornament (as shown in FIG. 6).

Based on aforediscussed embodiment, this invention is whereby presenting the following advantages:

1. the noses of the spindles, which are formed of tapering sockets instead of the tapering pointed plug of the prior art, can provide a firm protection to the pinions from breaking up during the stage of manufacturing, packing or transportation;

2. the development of a tubed tapering pointed plug in this invention facilitates an easy and accurate settlement of the spindles in place in the respective plugs which provides a rapid assembling of the components during manufacturing;

3. most of the components in this invention which are integrally made of plastic material and/or plastic steel instead of the ruby or frictionless steel, will prevent the components from cracking or rusting and hence the reduction of the cost to manufacture.

4. since the length of the tapering pointed plugs on the inner surface of the rectangular cover are less than the height of the downward flange thereof, that provides sufficient protection to those plugs from external impact; and 5. the adaption of an elastic rectangular bar instead of a stable brake block for disturbing the first pinion to perform bilateral rotations will eliminate the tapping noise and enlarge the extent of the bilateral rotation to exceed 360°.

The scope of this invention should be determined by the appended claims and their legal equivalents rather than by the aforesaid embodiment.

I claim:

1. A transmission assembly for providing bilateral rotations to an ornament comprising a casing enclosing a set of first, second and third pinions therein which are driven by a battery-operated electrical circuit; said casing comprising:

a tray shaped square lower portion, said lower portion being integrally formed with elevational walls on four sides and a compartment in the proximity of a rear side wall to define a battery chamber therein and comprising a tubular sleeve at the center of a circular depression with a pair of tubed tapering pointed plugs in the proximity of and extending upward from the inner surface of said lower portion, an elastic rectangular bar extended on one end from a side wall and terminated at a position in proximity of said circular depression, and a pair of rectangular grooves on the outer surface of two opposing walls of said elevational walls with centrally formed rectangular catches therein;

a rectangular cover, said cover having downward flanges on four sides integral with a pair of downward rectangular lugs on opposite lateral sides, each rectangular lug has a rectangular recess on its upper central portion; a tapering socket and a pair of tapering pointed plugs depending downward from the inner surface of said cover; and a plurality of screw apertures in said top cover;

said first pinion comprising a plastic gear and a metallic spindle perpendicularly secured at the center of said gear;

said plastic gear having on its under side integral with a downward journal, a downward elevationally varied annular ring for reinforcement and a downward stopping rod adjacent the outer periphery of said annular ring which cooperates with said elastic rectangular bar;

said metallic spindle having a tapering pointed plug at the top end and a larger diameter shoulder on an upper portion thereof for abutting against the under side of said downward journal;

said second pinion comprising a main plastic gear integral with a less diameter step gear extended from the center of the under side thereof, a further lesser diameter spindle depending from the lower end of said less diameter step gear, and a pair of the first and second tapering sockets respectively formed at the center of the upper surface of said main gear and the lower end of said spindle, said first tapering socket being slightly protruded from said upper surface of said main gear;

said third pinion comprising a plastic base and a flat magnetic annular ring, wherein said plastic base comprising a circular plate, a less diameter step gear extruding upwardly from the center of said circular plate, a multi-diameter spindle extending downwardly from the center of the under side of said circular plate, a pair of tapering sockets respectively formed on the top of said less diameter step gear and the lower end of said multi-diameter spindle, and four sectorial members spacedly extending radially from the circumference of said circular plate incorporated with a plurality of spacedly outcurved flange members which are extended downwardly from the circumference of said circular plate for forming an annular grasping space to secure said flat magnetic annular ring therein;

wherein said first pinion is rotatable bilaterally and is driven indirectly by said battery-operated electrical circuit via said third pinion and restricted by said elastic rectangular bar and said second pinion.

* * * * *